(12) United States Patent
Hirakata et al.

(10) Patent No.: US 6,411,917 B1
(45) Date of Patent: Jun. 25, 2002

(54) ENGINE SPEED CALCULATING APPARATUS

(75) Inventors: Yoshiaki Hirakata; Masahiko Abe; Yasuo Iwata, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/339,259

(22) Filed: Jun. 24, 1999

(30) Foreign Application Priority Data

Jun. 26, 1998 (JP) .......................................... 10-180170

(51) Int. Cl.[7] ................................................. G01P 3/00
(52) U.S. Cl. ...................... 702/145; 702/147; 290/38 R
(58) Field of Search .......................... 702/96, 142, 145, 702/148, 149, 147; 701/109, 101; 123/492; 290/38 R

(56) References Cited

U.S. PATENT DOCUMENTS

| | | | |
|---|---|---|---|
| 4,274,142 A | | 6/1981 | Furuhashi et al. ........... 702/145 |
| 4,290,107 A | * | 9/1981 | Suda et al. .................. 701/109 |
| 4,485,452 A | | 11/1984 | Cording et al. ............. 702/147 |
| 4,779,214 A | | 10/1988 | Kinugasa .................... 702/147 |
| 4,864,999 A | * | 9/1989 | Fujisawa ..................... 123/492 |
| 5,305,220 A | | 4/1994 | Schoggl ....................... 701/101 |
| 5,818,116 A | * | 10/1998 | Nakae et al. ............. 290/38 R |
| 6,135,095 A | * | 10/2000 | Motose ........................ 123/481 |

FOREIGN PATENT DOCUMENTS

| | | |
|---|---|---|
| JP | A 61 277845 | 12/1986 |
| JP | A 9 264241 | 10/1997 |

* cited by examiner

*Primary Examiner*—Marc S. Hoff
*Assistant Examiner*—Mohamed Charioui
(74) *Attorney, Agent, or Firm*—Birch, Stewart, Kolasch & Birch, LLP

(57) ABSTRACT

An engine speed calculating apparatus capable of calculating an engine speed without being affected by pulsating revolutions in a low engine speed range. A time required for a crankshaft of an engine to revolve through a predetermined angle is measured upon each completion of revolution through the predetermined angle, and an engine speed is calculated on the basis of measured result data of the time required for revolution through the predetermined angle. When the preceding calculated engine speed is determined to be lower than a predetermined engine speed, an engine speed is calculated on the basis of a time required for the crankshaft to revolve through an angle larger than the predetermined angle.

6 Claims, 7 Drawing Sheets

ENGINE SPEED CALCULATING APPARATUS

BACKGROUND OF THE INVENTION

1. Field of the Invention

The present invention relates to an engine speed calculating apparatus for computing the number of revolutions per minute at which an engine is turning.

2. Description of the Related Art

In a conventional arrangement for engine speed calculation, a time required for a crankshaft to revolve through a particular predetermined angle is measured and an engine speed is determined on the basis of measured result data of the time required for revolution through the predetermined angle. More specifically, a time required for revolution through a predetermined angle of 360 deg. is measured according to the generation timing of a crank pulse signal attained from a crankshaft position sensor, and then the reciprocal of the measured result value of the time required for 360 deg. of revolution is multiplied by 60, for example, to determine an engine speed. The engine speed thus determined is used as an important engine operation parameter in engine control operation such as fuel injection control (as disclosed in Japanese Unexamined Patent Publication No. Sho 61-277845 and No. Hei 9-264241, for example).

In a low engine speed range, however, a certain degree of pulsation occurs in revolutions of an engine even when a constant engine speed is to be provided, whereas such pulsation does not tend to occur in a high engine speed range. Therefore, in a calculation of a low engine speed using a time required for revolution through the same angle as in the high speed range, the result of the calculation represents a value of engine speed affected by pulsating revolutions, thus causing variations in engine speed values calculated in succession. Where such calculated result data of the engine speed affected by pulsating revolutions is used for engine control, there is a problem that satisfactory engine control is not performed.

This disadvantageous condition is particularly significant in an engine featuring unequal-interval ignition such as a V-type engine.

For instance, in an L-head four-cylinder engine featuring ordinary equal-interval ignition, each cylinder performs ignition (explosion) each time a crankshaft revolves through an angle of 180 deg. as shown in FIG. 1(a). In the sequence of first, third, second and fourth cylinders, ignition is performed repeatedly. More specifically, as shown in FIG. 1(b), each of expansion, exhaust, induction and compression strokes in each cylinder is performed synchronously at crank angle intervals of 180 deg. in a fashion that the first to four cylinders have mutually different kinds of strokes at each crank angle interval of 180 deg. in a crank angle cycle of 720 deg. Accordingly, during a period corresponding to each crank angle interval of 180 deg., each of the expansion, exhaust, induction and compression strokes is performed in any one of the four cylinders respectively, i.e., the same kind of stroke is not taken simultaneously in a plurality of the cylinders. The expansion stroke for accelerating the crankshaft with downward movement of a piston forced by combustion pressure and the compression stroke for compressing an intake air-fuel mixture to cause deceleration of the crankshaft take place simultaneously in crank angle intervals of 180 deg. Therefore, a relatively high degree of balance is maintained to equilibrate revolutions of the crankshaft, and engine speed calculation is not likely to be affected by pulsating revolutions except for variations among the cylinders.

By way of contrast, in a V-type four-cylinder engine featuring unequal-interval ignition, ignition (explosion) is performed repeatedly in the sequence of first, third, second and fourth cylinders as shown in FIG. 2(a). After ignition in the first cylinder at a crank angle of 0 deg., a crank angle interval of 180 deg. is taken until ignition in the third cylinder, a crank angle interval of 270 deg. is taken between ignition in the third cylinder and ignition in the second cylinder, a crank angle interval of 180 deg. is taken between ignition in the second cylinder and ignition in the fourth cylinder, and then a crank angle interval of 90 deg. is taken between ignition in the fourth cylinder and ignition in the first cylinder. More specifically, as shown in FIG. 2(b), although each of expansion, exhaust, induction end compression strokes in each cylinder is performed at crank angle intervals of 180 deg., each stroke transition point is different by 90 deg. between a pair of the first and third cylinders and a pair of the second and fourth cylinders. Therefore, in a cycle in which a crankshaft revolves two turns from a crank angle of 0 deg. to a crank angle of 720 deg., the number of ignitions during a one-turn period from a crank angle of 360 deg. to a crank angle of 720 deg. is larger than that during a one-turn period from a crank angle of 0 deg. to a crank angle of 360 deg. Since there is a crank angle interval of 270 deg. between a point in time of ignition in the third cylinder and that in the second cylinder, the crankshaft tends to be decelerated immediately before ignition in the second cylinder. On the contrary, since there is a relatively short interval of 90 deg. between a point in time of ignition in the fourth cylinder and that in the first cylinder, the crankshaft tends to be accelerated immediately before and after ignition in the first cylinder. During a period from 0 deg. to 90 deg. in each cycle (period "A" indicated in FIG. 2(b)), the expansion stroke is duplicated in the first and fourth cylinders so that the crankshaft tends to be accelerated increasingly. Further, during a period from 360 deg. to 450 deg. (period "B" indicated in FIG. 2(b)), no expansion stroke takes place in any cylinder whereas the compression stroke is performed in the second cylinder, thereby causing a tendency of decelerating the crankshaft. Consequently, in the V-type four-cylinder engine or a similar engine featuring unequal-interval ignition, a degree of engine running pulsation in a one-turn period from a crank angle of 0 deg. to a crank angle of 360 deg. differs from that in the next one-turn period from a crank angle of 360 deg. to a crank angle of 720 deg. In a low engine speed range in particular, engine speed calculation is likely to be affected by pulsating revolutions.

SUMMARY AND OBJECTS OF THE INVENTION

It is therefore an object of the present invention to obviate the above mentioned disadvantage by providing an engine speed calculating apparatus which is capable of performing engine speed calculation without being affected by pulsating revolutions in a low engine speed range.

In accomplishing this object of the present invention and according to one aspect thereof, there is provided an engine speed calculating apparatus. The apparatus is for measuring a time required for a crankshaft of an engine to revolve through a predetermined angle upon each completion of revolution through the predetermined angle end calculating an engine speed on the basis of measured result data of the time required for revolution through the predetermined angle. The apparatus includes determining means for determining whether the preceding calculated engine speed is lower than a predetermined engine speed; and calculating means for performing engine speed calculation on the basis of a time required for the crankshaft to revolve through an angle larger than the predetermined angle when the preceding calculated engine speed is determined to be lower than the predetermined engine speed.

In the above aspect of the present invention, an engine speed in a low speed range is calculated on the basis of a time required for the crankshaft to revolve through an angle larger than the predetermined angle. Since the engine speed is thereby averaged to a degree larger than that in a high speed range, engine speed calculation can be performed without being affected by pulsating revolutions. Further, in a high speed range where a degree of engine running pulsation is relatively low, an engine speed is calculated on the basis of a time required for the crankshaft to revolve through the predetermined angle. Therefore, it is possible to perform accurate engine speed calculation while following up variations in actual engine speed.

Furthermore, according to another aspect of the present invention, in engine speed calculation teased on a time required for the crankshaft to revolve through an angle larger than the predetermined angle, a multiple of the predetermined angle is used as the angle larger than the predetermined angle. Thus, a time required for revolution through the predetermined angle is measured constantly. In the high speed range, each period of time required for revolution through the predetermined angle is used directly to calculate an engine speed. In the low speed range, the sum of a plurality of consecutive periods, each representing a time required for revolution through the predetermined angle, is used to calculate an engine speed.

This arrangement facilitates the processing of engine speed calculation.

DETAILED DESCRIPTION OF PREFERRED EMBODIMENTS

The present invention will now be described in detail by way of example with reference to the accompanying drawings.

Figure 3:
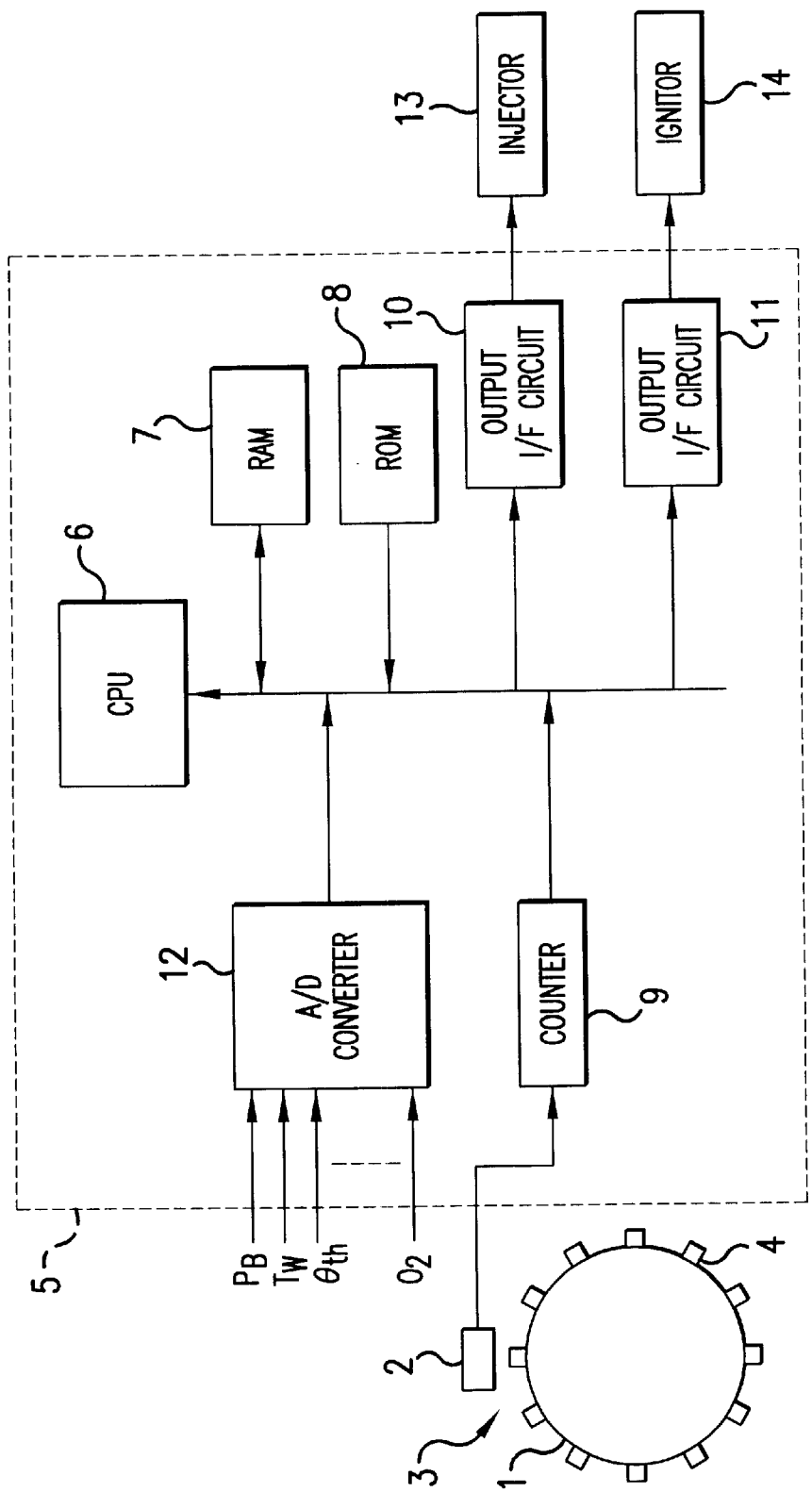
FIG. 3 is a block diagram showing a preferred embodiment of the present invention.

Referring to FIG. 3, there is shown an engine control system including an engine speed calculating apparatus according to the present invention. A crankshaft position sensor 3 comprising a rotator 1 and an electromagnetic pickup 2 is used in the engine control system. The rotator 1 is a disc equipped on a crankshaft (not shown) of a four-cycle internal combustion engine, which is rotated in linkage with the crankshaft. On the periphery of the rotator 1, twelve convex parts 4 equally spaced in increments of 30 deg. are provided as elements to be detected. The electromagnetic pickup 2 is disposed in the vicinity of the periphery of the rotator 1. When the rotator 1 rotates to bring any one of the convex parts to the vicinity of the electromagnetic pickup 2, a crank pulse is generated from the electromagnetic pickup 2.

The electromagnetic pickup 2 has an output connection with an ECU 5 (electronic control unit), which comprises a CPU 6, RAM 7, ROM 8, counter 9, output interface circuits 10 and 11, and analog-digital converter 12. Using crank pulses output from the electromagnetic pickup 2, the counter 9 counts the number of clock pulses output from a clock signal generator (not shown). Thus, a time interval between crank pulses "Me" is attained by counting the number of clock pulses. The CPU 6 carries out interrupt processing on the leading edge of a crank pulse. In the present preferred embodiment, the CPU 6, RAM 7, ROM 8, counter 9, output interface circuits 10 and 11, and analog-digital converter 12 are connected with a common bus.

The analog-digital converter 12 is equipped for digitizing analog signals received from a plurality of sensors which detect engine operation parameters necessary for engine control such as intake pipe internal pressure $P_B$ cooling water temperature TW, a throttle angle θth, and oxygen concentration in exhaust gas $O_2$. Using these engine operation parameters and an engine speed "Ne" calculated through the sequence to be described later, the CPU 6 determines the quantity of fuel to be injected and a point in time of ignition, issues an injector drive instruction for indicating injection of the determined quantity of fuel, and generates an ignition timing signal for indicating the determined point in time of ignition.

In response to the injector drive instruction from the CPU 6, the output interface circuit 10 drives an injector 13. The injector 13 is disposed in the vicinity of an intake port of an intake pipe equipped on the internal combustion engine. The injector 13 injects fuel when it is driven. The output interface circuit 11 activates an igniter 14 according to the ignition timing signal received from the CPU 6.

In the present preferred embodiment arranged as mentioned above, for calculating engine speed "Ne", the CPU 6 carries out "Me" calculating operation and "Ne" calculating operation according interrupt processing routines pre-stored in the ROM 8.

Figure 4:
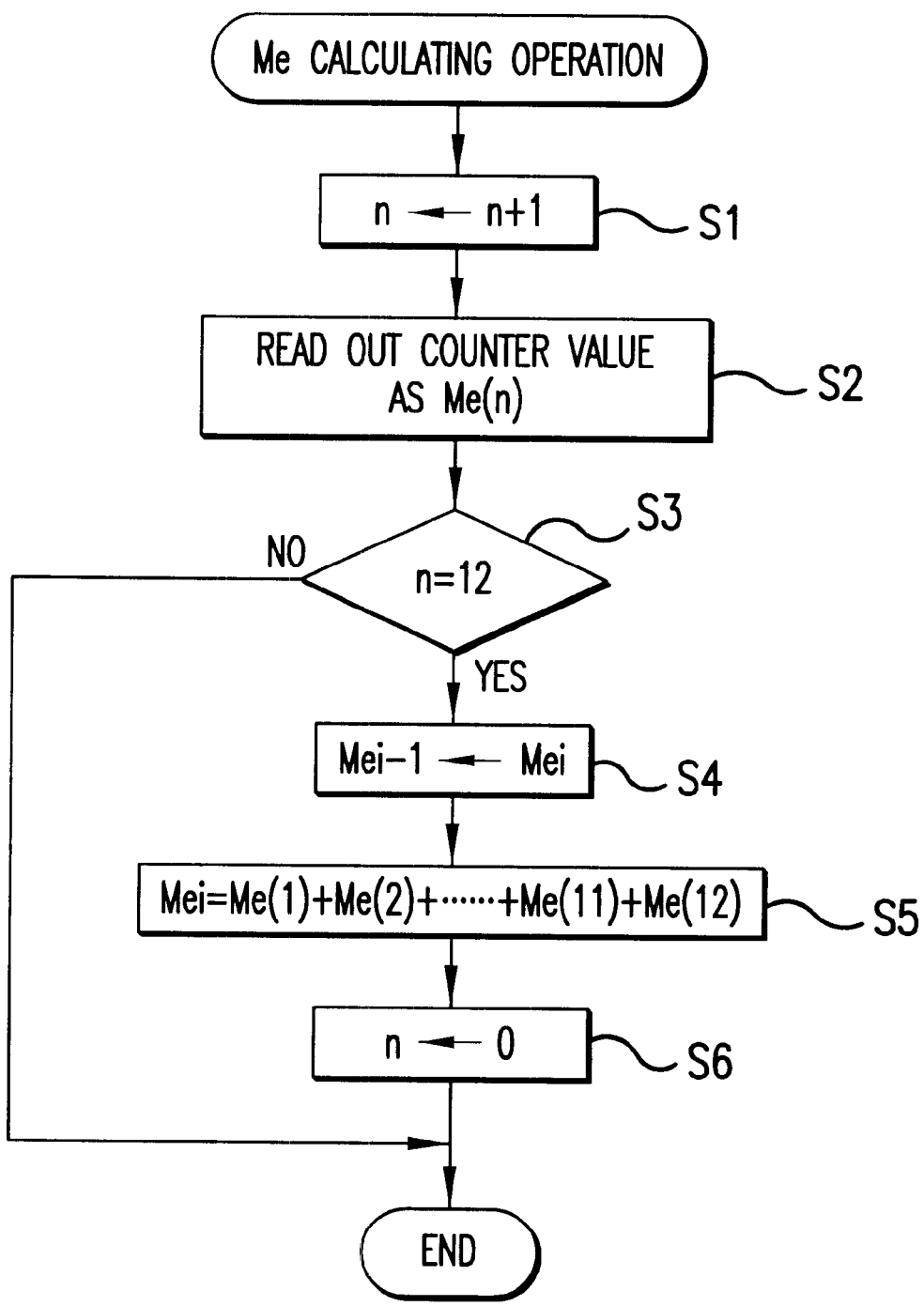
FIG. 4 is a flowchart showing an "Me" calculating operation routine.

"Me" calculating operation is performed to determine a time period "Me" taken for the rotator I linked with the crankshaft to rotate through an angle of 360 deg. On the leading edge of a crank pulse output from the crankshaft position sensor 3, the CPU 6 performs "Me" calculation according to the interrupt processing routine flowcharted in FIG. 4. To be more specific, "1" is added to a variable "n" first (step S1), and then a count value of the counter 9 is read out and stored as a time period "Me (n) [sec]" (step S2). The variable "n" has an initial value of "0". When "n"="1", "Me (n)" becomes "Me (1)". After execution of step S2, it is determined whether the variable "n" is equal to "12" or not (step S3). If "n"≠"12", "Me" calculation is terminated. If "n"="12," the current time period up to the present point in time "$Me_i$" is assigned to the previous time period "$Me_{i-1}$" (step S4). Thereafter, as expressed in the equation shown below, all of "Me (1)" to "Me (12)" are added to calculate a value of current time period "$Me_i$ [sec]", which is then stored into the RAM 7 (step S5).

$$Me_i = Me(1) + Me(2) + + Me(11) + Me (12) \qquad \text{Equation 1}$$

After execution of step S5, the variable "n" is reset to "0" (step S6). Thus, "Me" calculation is terminated.

Since a TDC signal indicating a point in time when a piston in a particular cylinder reaches the top dead center thereof is issued from the crankshaft position sensor 3 in common arrangements, the variable "n" may be reset to "0" in response to the TDC signal.

Figure 5:
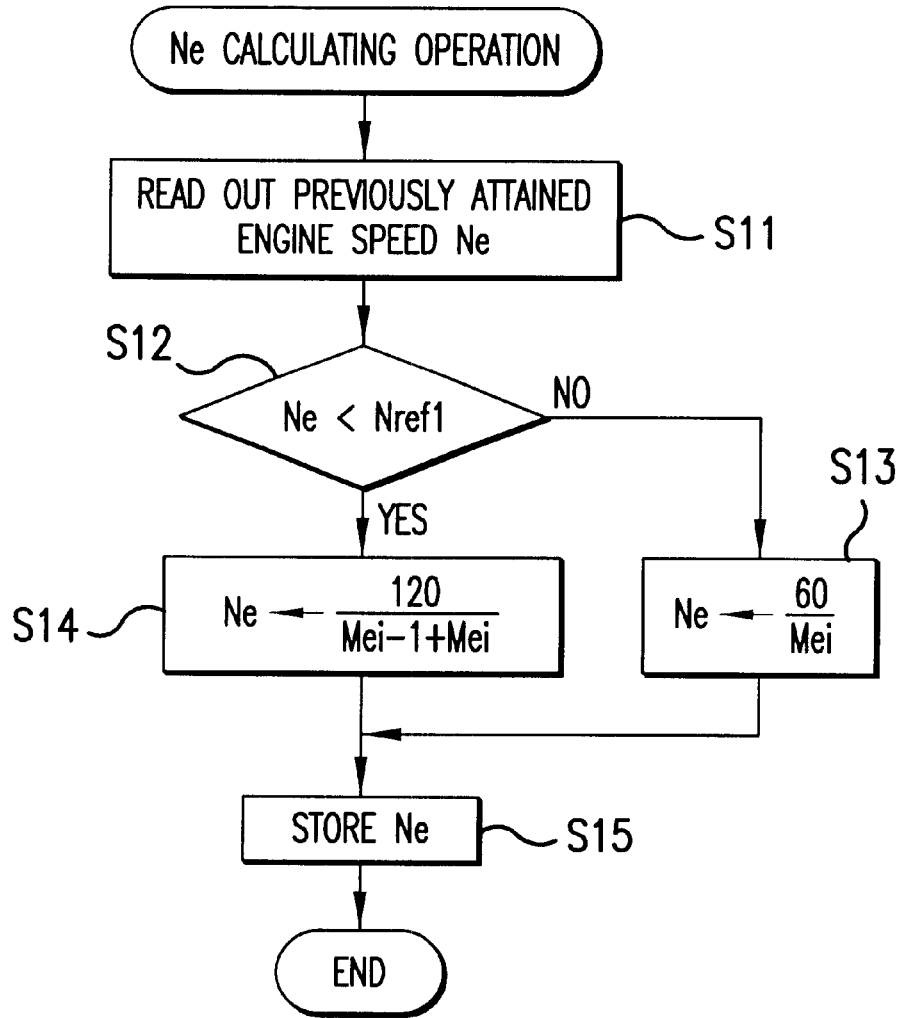
FIG. 5 is a flowchart showing an "Ne" calculating operation routine.

In contrast, "Ne" calculating operation is performed as an interrupt routine in the CPU 6 in synchronism with the TDC signal each time the crankshaft revolves one turn or on occurrence of any event for which a data value of engine speed "Ne" is required. More specifically, as shown in FIG. 5, the CPU 6 reads out a value of engine speed "Ne" previously attained in "Ne" calculation (step S11), and then the CPU 6 determines whether the engine speed "Ne" is lower than a predetermined engine speed "Nref1" (e.g., 5000 [rpm]) (step S12). If "Ne"≧"Nref1", a value of engine speed "Ne [rpm]" is calculated using an expression "60/$Me_i$" (step S13). If "Ne"<"Nref1", a value of engine speed "Ne [rpm]" is calculated using an expression "120/($Me_{i-1}$+$Me_1$) (step S14). The engine speed value "Ne" thus calculated at step S13 or S14 is stored into the RAM 7 (step S15). Then, in the next "Ne" calculation, the engine speed value "Ne" held in the RAM 7 is read out at step S11.

At steps S13 and S14, "60" and "120" is represented in seconds.

As described above, in a high engine speed range where the previously calculated engine speed "Ne" is higher than or equal to the predetermined engine speed "Nref1", a new value of engine speed "Ne" is calculated using a value of time period "$Me_i$ [sec] taken for the crankshaft to revolve one turn. In a low engine speed range where the previously calculated engine speed "Ne" is lower than the predetermined engine speed "Nref1", a new value of engine speed "Ne" is calculated using a value of time period "$Me_{i-1}$+$Me_i$ [sec]" taken for the crankshaft to revolve two turns.

In the present preferred embodiment mentioned above, calculation of engine speed "Ne" is carried out each time the crankshaft revolves one turn regardless of the length of the revolution cycle used for the calculation in either of the high engine speed range where "Ne"≧"Nref1" and the low engine speed range where "Ne"<"Nref1". In a modified embodiment of the invention, the following arrangement may be made: In the high engine speed range where "Ne"≧"Nref1", calculation of engine speed "Ne" is performed each time the crankshaft revolves one turn, and in the low engine speed range where "Ne"<"Nref1", calculation of engine speed "Ne" is performed each time the crankshaft revolves two turns.

Further, the following modification may be made: After the latest value of engine speed "Ne (n)" is calculated each time the crankshaft revolves one turn, the latest value of engine speed "Ne (n)" is assigned as engine speed "Ne" in the high engine speed range where "Ne">"Nref1", and an average value of engine speed "Ne (n)" and engine speed "Ne (n−1)" in the previous revolution is assigned as engine speed "Ne" in the low engine speed range where "Ne"<"Nref1".

Still further, while a time period "Me (n)" taken for the crank shaft to revolve through an angle of 30 deg. is measured and the measured value of "Me (n)" is added with respect to a time period taken for the crankshaft to revolve one turn for calculation of "$Me_i$" in the present preferred embodiment, there may also be provided such a modified arrangement that continuous measurement of "$Me_i$" taken for the crankshaft to revolve one turn is performed in synchronism with the TDC signal of a particular cylinder.

Figure 6:
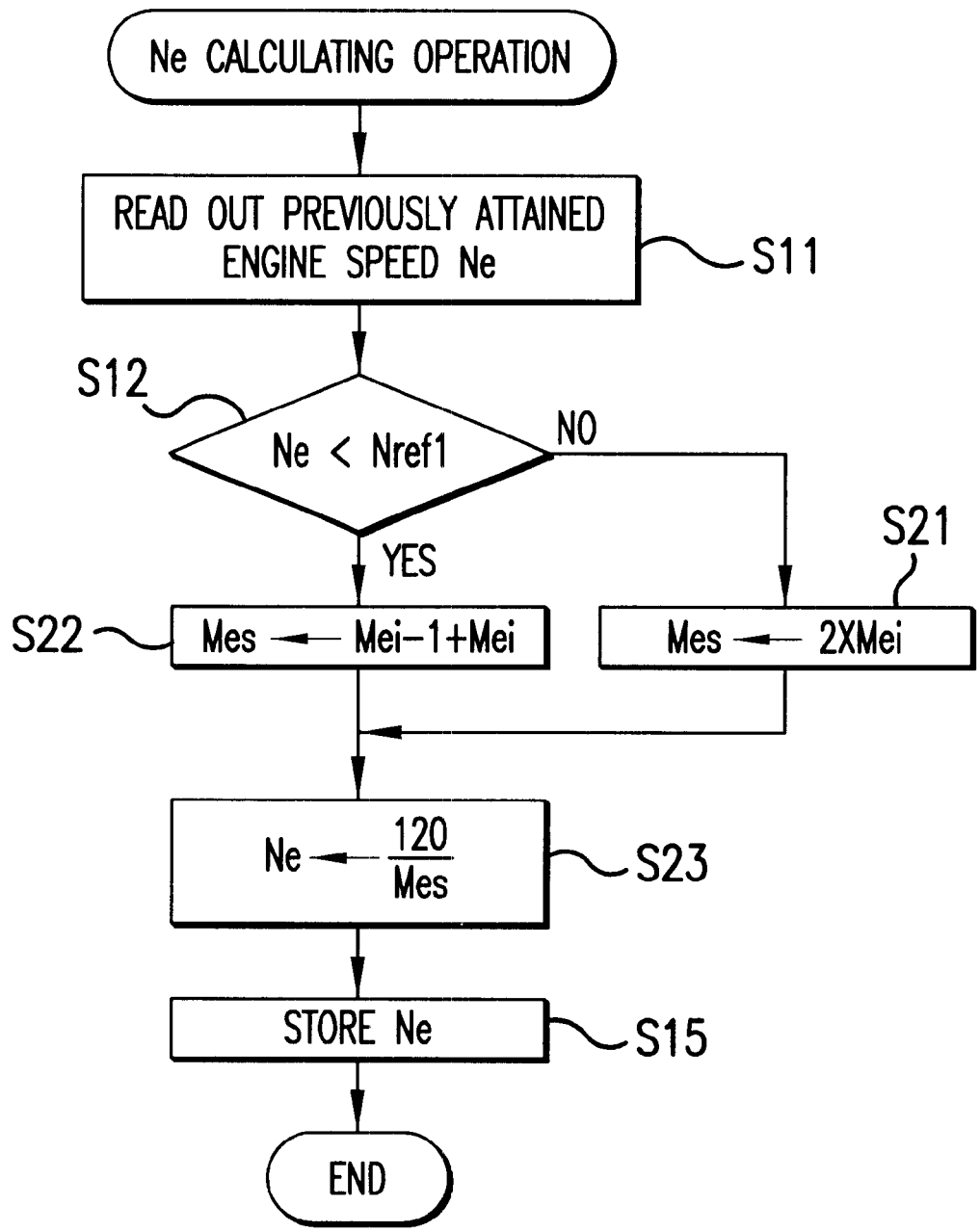
FIG. 6 is a flowchart showing another "Ne" calculating operation routine.

Furthermore, in another modified arrangement, a common arithmetic expression may be employed for calculation of engine speed "Ne" in either of the high engine speed and low engine speed ranges. In this modified arrangement, "($Me_{i-1}$+$Me_i$)" is used for calculation at the time of low engine speed, and "($2Me_i$)" is used for calculation at the time of high engine speed. Thus, a common arithmetic division form for calculation of engine speed "Ne" can be applied to either of the low engine speed and high engine speed ranges. More specifically, as shown in FIG. 6, the CPU 6 carries out steps S11 and S12 in the same manner as in "Ne" calculation flow charted in FIG. 5. Then, if the result of determination at step S12 indicates a high engine speed range where "Ne"≧"Nref1", a value of two times the current time period "$Me_i$" is assigned to "Mes" (step S21). If the result of determination at step S12 indicates a low engine speed range where "Ne"<"Nref1", the sum of the previous time period "$Me_{i-1}$" and the current time period "$Me_i$" is assigned to "Mes" (step S22). Based on a value of time period "Mes" attained at step S21 or S22, a value of the engine speed "Ne [rpm]" is calculated using an expression "120/Mes" (step S23). Then, at step S15, the engine speed value "Ne" is stored into the RAM 7.

Figure 7:
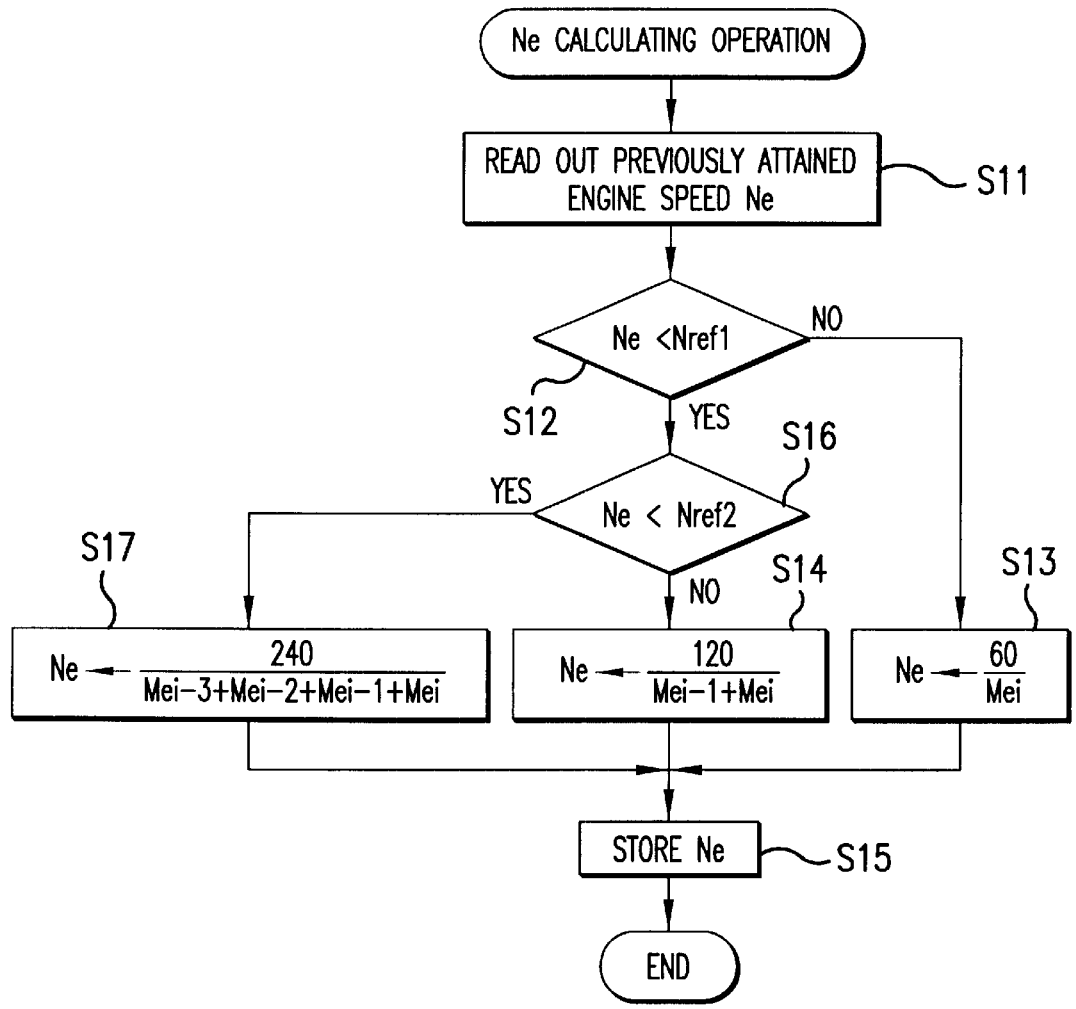
FIG. 7 is a flowchart showing another "Ne" calculating operation routine.

Referring to FIG. 7, there is shown another preferred embodiment of "Ne" calculating operation according to the present invention. In "Ne" calculating operation flow charted in FIG. 7, the steps equivalent to those in FIG. 8 have the same reference characters. If, at step S12, the CPU 6 recognizes that "Ne"<"Nref1", the CPU 6 then proceeds to determination whether an engine speed "Ne" read out at step S11 is lower than a predetermined engine speed "Nref2" (e.g., 1,000 [rpm]) (step S16). In case that "Ne"≧"Nref2", i.e., "Nref2"<"Ne"<"Nref1", step S14 is taken to calculate a value of engine speed "Ne [rpm]" using an expression "120/($Me_{i-1}$+Me). In case that "Ne"<"Nref2", a value of engine speed "Ne [rpm]" is calculated using an expression "240/($Me_{i-3}$+$Me_{i-2}$+$Me_{i-1}$+$Me_i$)" (step S17). Each of the steps $Me_{i-3}$+$Me_{i-2}$+$Me_i$+$Me_i$ attained in "Me" calculation represents a time period taken for the crankshaft to revolve one turn. In case of the present preferred embodiment, it is necessary to store the second preceding time period "$Me_{i-2}$" and the third preceding time period "$Me_{i-3}$" as well as the current time period "$Me_i$" and the last time period (immediately preceding time period) "Men".

In the preferred embodiment flowcharted in FIG. 7, in a high engine speed range where the previously calculated engine speed "Ne" is higher than or equal to the predetermined engine speed "Nref1", a new value of engine speed "Ne" is calculated using a value of time period "$Me_i$ [sec] taken for the crankshaft to revolve one turn. In a low engine speed range where the previously calculated engine speed "Ne" is lower than the predetermined engine speed "Nref1" and higher than or equal to the predetermined engine speed "Nref2", a new value of engine speed "Ne" is calculated using a value of time period "$Me_{i-1}$+$M_i$ [sec]" taken for the crankshaft to revolve two turns. In a still lower engine speed range where the previously calculated engine speed "Ne" is even lower than the predetermined engine speed "Nref2", a new value of engine speed "Ne" is calculated using a time period "$Ne_{i-3}$+$Me_{i-2}$+$Me_{i-1}$+$Me_i$ [sec]" taken for the crankshaft to revolve four turns.

As set forth hereinabove and according to the present invention, an engine speed in a low speed range is calculated on the basis of a time taken for the crankshaft to revolve through an angle larger than a predetermined angle. Since the engine speed is thereby averaged to a degree larger than that in a high speed range, engine speed calculation can be performed without being affected by pulsating revolutions. Further, in a high speed range where a degree of engine running pulsation is relatively low, an engine speed is calculated on the basis of a time taken for the crankshaft to revolve through the predetermined angle, thus making it possible to perform accurate engine speed calculation while following up variations in actual engine speed. Therefore, the use of engine speed data calculated by the engine speed calculating apparatus according to the present invention enables implementation of satisfactory engine control.

Figure 1:
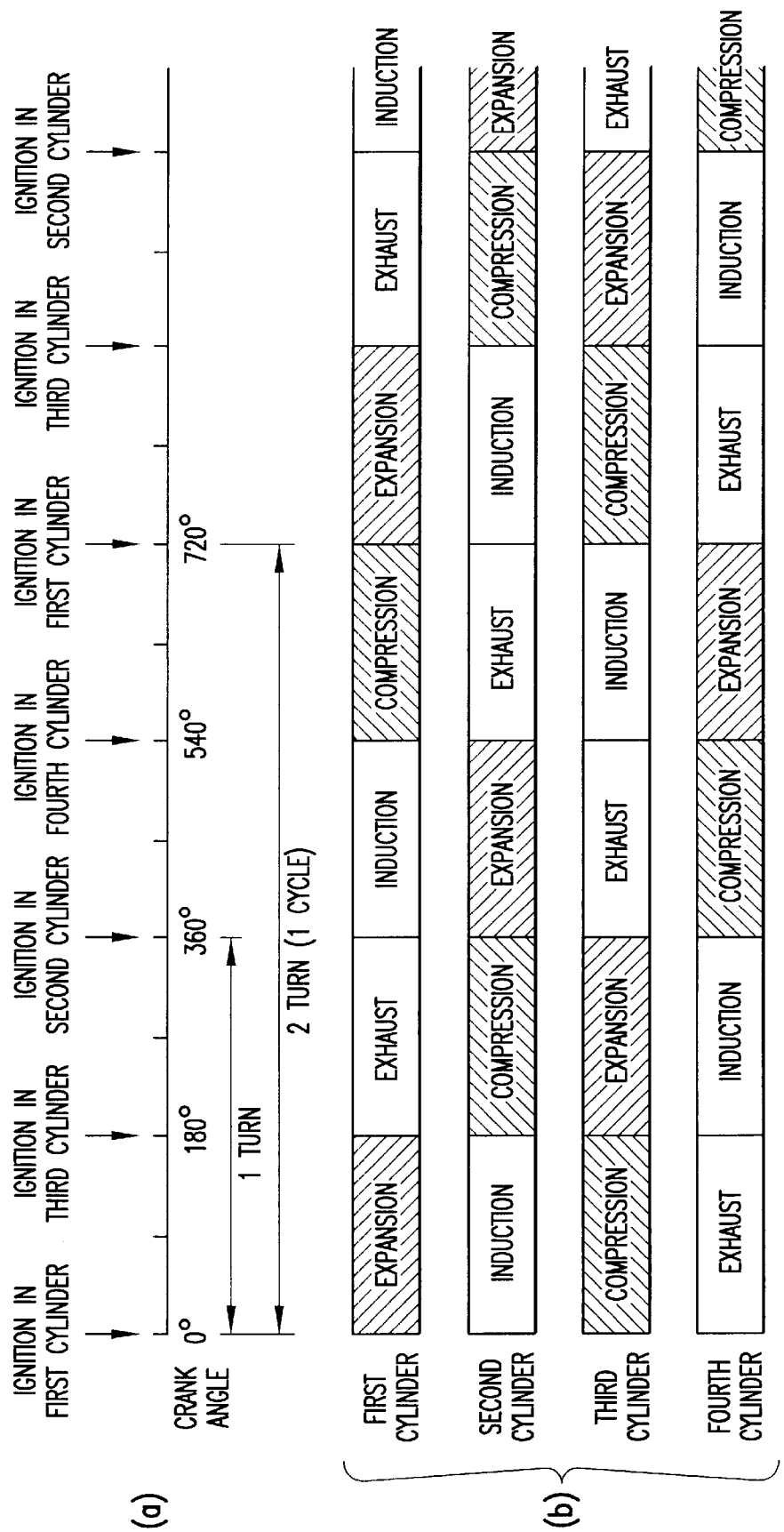
FIG. 1 is a diagram showing ignition timing and stoke intervals in each cylinder of an L-head four-cylinder engine.
Figure 2:
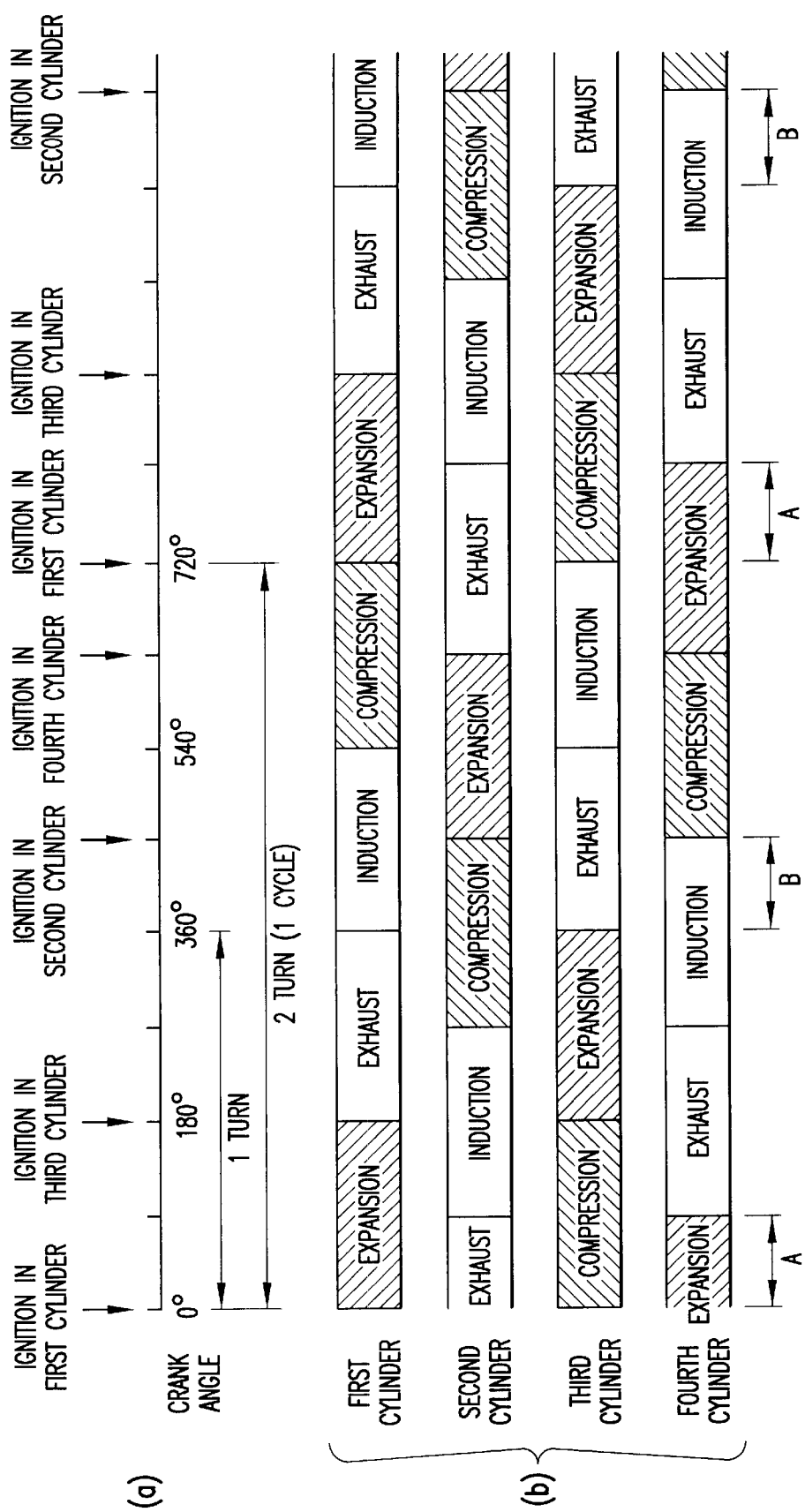
FIG. 2 is a diagram showing ignition timing and stroke intervals in each cylinder of a V-type four-cylinder engine.

In a V-type four-cylinder engine or a similar engine featuring unequal-interval ignition in particular, which has ignition timing and stroke intervals in each cylinder as shown in FIG. 2, even if a degree of engine running pulsation differs between a one-turn cycle ranging from 0 deg. to 360 deg. in crank angle and the next one-turn cycle ranging from 360 deg. to 720 deg. in crank angle, it is possible to calculate an engine speed accurately in a low speed range without being affected by pulsating revolutions therein.

Furthermore, since a multiple of the predetermined angle is used as the angle larger than the predetermined angle, a time required for revolution through the predetermined angle is measured constantly. In the high speed range, each period of time required for revolution through the predetermined angle is used directly for engine speed calculation. In the low speed range, the sum of a plurality of consecutive time periods, each representing a time required for revolution through the predetermined angle, is used for engine speed calculation.

Thus, it is possible to facilitate the processing of engine speed calculation.

What is claimed is:

1. An engine speed calculating apparatus for measuring a time required for a crankshaft of an engine to revolve through a predetermined angle upon each completion of a revolution through the predetermined angle and calculating an engine speed on the basis of measured result data of the time required for a revolution through the predetermined angle comprising:

determining means for determining whether the preceding calculated engine speed is lower than a predetermined engine speed; and calculating means for performing engine speed calculation on the basis of a time required for said crankshaft to revolve through an angle larger than said predetermined angle when said preceding calculated engine speed is determined to be lower than said predetermined engine speed, wherein said angle larger than said predetermined angle is a multiple of said predetermined angle, wherein the time required for a revolution through the predetermined angle is measured constantly, wherein in a high speed range, each period of time required for a revolution through the predetermined angle is used directly to calculate the engine speed, and wherein in a low speed range, the sum of a plurality of consecutive periods, each representing a time required for a revolution through the predetermined angle, is used to calculate the engine speed.

2. The engine speed calculating apparatus according to claim 1, wherein an engine speed in a low speed range is calculated on the basis of a time required for the crankshaft to revolve through an angle larger than the predetermined angle when the preceding calculated engine speed is determined to be lower than the predetermined engine speed.

3. The engine speed calculating apparatus according to claim 1, wherein an engine speed in a high speed range is calculated on the basis of a time required for the crankshaft to revolve through the predetermined angle.

4. An engine speed calculating apparatus for measuring a time required for a crankshaft of an engine to revolve through a predetermined angle upon each completion of a revolution through the predetermined angle and calculating an engine speed on the basis of measured result data of the time required for a revolution through the predetermined angle comprising:

determining means for determining whether the preceding calculated engine speed is lower than a predetermined engine speed; and an electronic control unit for calculating a time period of rotation through an angle of 360 deg. by performing engine speed calculations on the basis of a time required for said crankshaft to revolve through an angle larger than said predetermined angle when said preceding calculated engine speed is determined to be lower than said predetermined engine speed, wherein said angle larger than said predetermined angle is a multiple of said predetermined angle, wherein the time required for a revolution through the predetermined angle is measured constantly, wherein in a high speed range, each period of time required for a revolution through the predetermined angle is used directly to calculate the engine speed, and wherein in a low speed range, the sum of a plurality of consecutive periods, each representing a time required for a revolution through the predetermined angle, is used to calculate the engine speed.

5. The engine speed calculating apparatus according to claim 4, wherein an engine speed in a low speed range is calculated on the basis of a time required for the crankshaft to revolve through an angle larger than the predetermined angle when the preceding calculated engine speed is determined to be lower than the predetermined engine speed.

6. The engine speed calculating apparatus according to claim 4, wherein an engine speed in a high speed range is calculated on the basis of a time required for the crankshaft to revolve through the predetermined angle.

* * * * *